AFC SYSTEM FOR TELEVISION RECEIVER

Filed April 18, 1968 2 Sheets-Sheet 1

INVENTOR.
CHARLES B. NEAL &
DONG W. RHEE
BY
Cyril A. Krenzer
ATTORNEY

AFC SYSTEM FOR TELEVISION RECEIVER

Filed April 18, 1968 2 Sheets-Sheet 2

INVENTOR.
CHARLES B. NEAL &
DONG W. RHEE
BY
ATTORNEY 3,499,981

AFC SYSTEM FOR TELEVISION RECEIVER

Charles Bailey Neal, Batavia, and Dong W. Rhee, Williamsville, N.Y., assignors to Sylvania Electric Products Inc., a corporation of Delaware

Filed Apr. 18, 1968, Ser. No. 722,367

Int. Cl. H04n *5/50*

U.S. Cl. 178—7.3 6 Claims

ABSTRACT OF THE DISCLOSURE

In a television receiver automatic frequency control (AFC) system wherein means are provided for developing and applying an error signal for automatically shifting an oscillator developed carrier signal to provide an intermediate carrier signal at the tuned intermediate frequency, a weak signal optimizing circuit coupled to the error signal developing means for shifting the frequency of the intermediate carrier signal in accordance with the magnitude of a received picture carrier signal whereby the signal-to-noise ratio of the picture signal is enhanced.

BACKGROUND OF THE INVENTION

In present day inter-carrier sound television receivers, it is normal to include an automatic frequency control (AFC) system. Usually, the AFC system is of the closed loop type wherein a radio frequency (RF) picture carrier signal and an oscillator developed carrier signal are combined and applied to a tuned signal processing channel. Deviations in frequency between the combined carrier signal and the signal processing channel tuning are detected to provide an error signal. In turn, the error signal is applied to and varies the frequency of the oscillator developed carrier signal such that the frequency of the combined carrier signal is substantially the frequency to which the signal processing channel is tuned.

Although the above-described AFC systems have been and still are widely employed in television receivers, it has been found that such systems do leave something to be desired. More specifically it has been found that television receivers employing the inter-carrier sound system have a tendency to block when a relatively weak picture carrier signal is received. In other words, the adjacent sound carrier signal tends to detract from a relatively weak picture carrier signal whereupon the error signal developed by the AFC detection system is of a polarity opposite from the desired polarity. As a result, the error signal is applied to and causes a variation in the frequency of the oscillator developed signal in a direction opposite from that which is desired. Thus, the AFC system not only fails to improve the tuning of the receiver when a relatively weak signal is received but also serves to undesirably de-tune the receiver.

OBJECTS AND SUMMARY OF THE INVENTION

Therefore, it is an object of the present invention to provide an enhanced automatic frequency control (AFC) system for a television receiver. Another object of the invention is to provide signal optimizing circuitry for shifting the picture carrier frequency of an intermediate frequency signal in accordance with the magnitude thereof. A further object of the invention is to provide means for automatically shifting the picture carrier frequency of an intermediate frequency signal in accordance with the magnitude of a received picture carrier signal.

These and other objects and advantages are achieved in one aspect of the invention by signal optimizing circuitry which includes means coupled to the error detection means of an AFC system for varying the center frequency of the error signal detector in accordance with the magnitude of a received picture carrier signal whereby the signal-to-noise of the receiver is enhanced.

DESCRIPTION OF THE PREFERRED EMBODIMENT

For better understanding of the present invention as well as other and further objects, advantages and capabilities thereof, reference is made to the accompanying drawings and appended claims in connection with the following disclosure.

Figure 1:
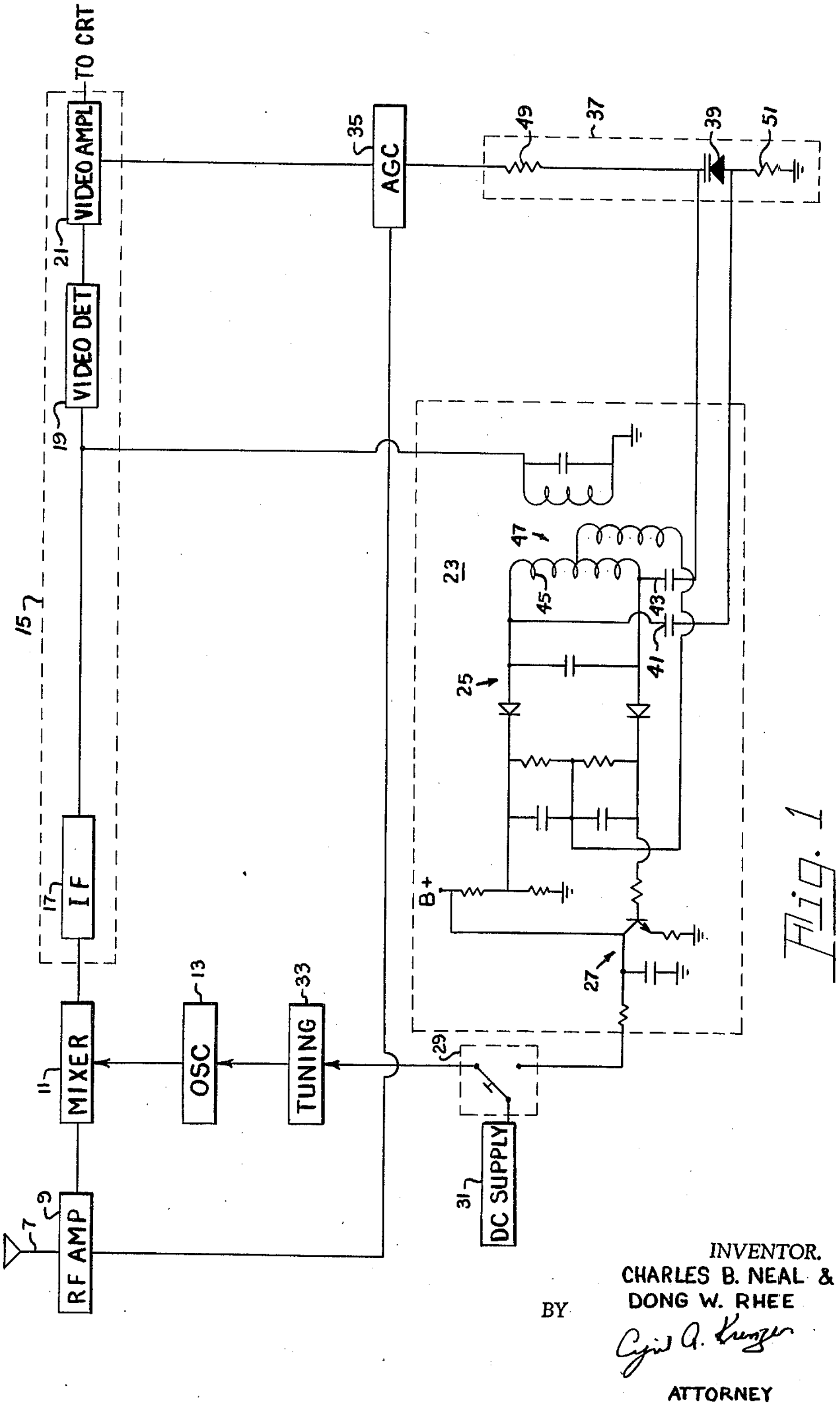
FIG. 1 is a partial diagram, in block and schematic form, of a television receiver illustrating signal optimizing circuitry in conjunction with an automatic frequency control (AFC) and an automatic gain control (AGC) system.

Referring to the partial diagram of a television receiver in block and schematic form illustrated in FIG. 1, the receiver includes an antenna 7 for intercepting transmitted television signals which are applied to a radio frequency (RF) amplifier stage 9. A mixer stage 11 receives output signals from the RF amplifier stage 9 and from an oscillator stage 13.

The mixer stage 11 receives a picture carrier signal from the RF amplifier stage 9 and a developed carrier signal from the oscillator stage 13. These two carrier signals are hetrodyned in the mixer stage 11 to provide a resultant carrier difference signal which is applied to a signal processing channel 15. The signal processing channel 15 includes an intermediate frequency (IF) stage 17 and the usual video detector 19 and video amplifier stages 21 for applying a processed signal representing intensity variations in a television picture to a cathode ray tube display device.

Coupled to the output of the IF stage 17 is an automatic frequency control (AFC) system 23. The AFC system 23 includes an error signal detector stage 25, and a DC amplifier stage 27 coupled thereto and via a manually operable AFC switching means 29, normally coupled to a DC source 31, to a tuning means 33 of the oscillator stage 13. Thus, a closed loop feedback type AFC system 23 is coupled intermediate the IF stage 17 and the oscillator stage 13.

Also, an automatic gain control (AGC) circuit 35 is coupled intermediate the video amplifier stage 21 and the RF amplifier stage 9. The AGC circuit 35 may be in any one of a number of conventional forms and provides a control potential which varies in accordance with the intensity of a received signal. Generally, the AGC circuit 35 serves to reduce the gain of the RF stage 9 upon receipt of a relatively strong signal.

Additionally, a signal optimizing circuit 37 is coupled to the AFC system 23 and, in this embodiment, to the AGC system 35. More specifically, the signal optimizing circuit 37 includes a variable capacitance diode device 39, AC coupled by a pair of capacitors 41 and 43 in shunting relationship with the secondary winding 45 of a frequency discriminator transformer 47 in the AFC system 23. Also, the variable capacitance diode device 39 is series connected via a pair of resistors 49 and 51 intermediate the AGC circuit 35 and a voltage reference level, such as circuit ground.

Figure 2:
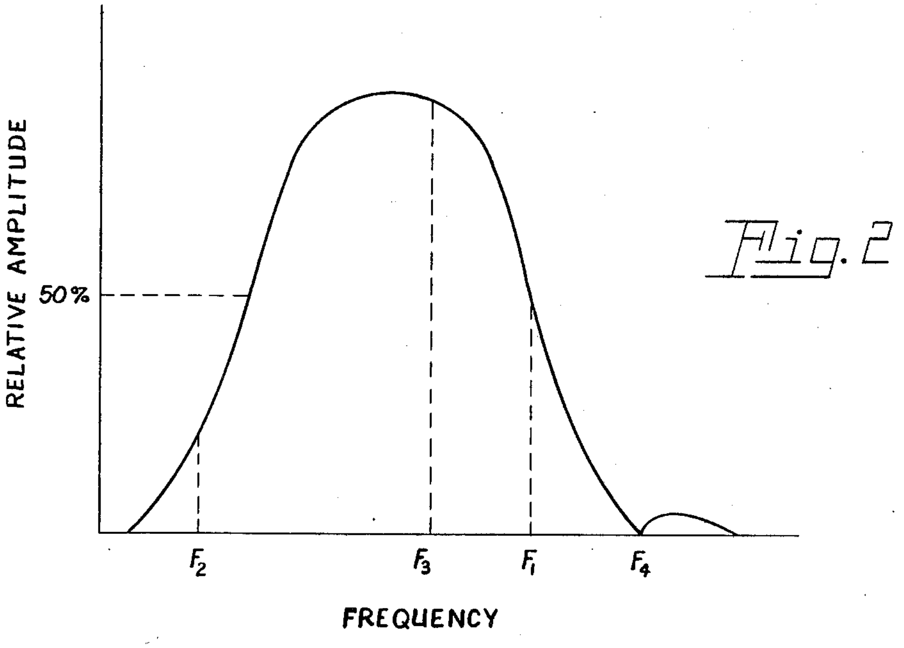
FIG. 2 illustrates an IF response curve suitable for assisting in the description of the operation of the circuitry of FIG. 1.

In order that the principles of operation may be better understood, reference is made to the IF response curve of FIG. 2. As shown therein, the picture carrier signal frequency $F_1$ is spaced exactly 4.5 mc. from the sound carrier signal frequency $F_2$ in accordance with present day television standards. Also, the IF response curve is such that the picture carrier signal frequency $F_1$ is normally at about the 50% amplitude point thereof.

In operation of the AFC system 23, the center frequency of the discriminator transformer 47, the discriminator transformer 47 has a center frequency which is normally tuned to a picture carrier signal frequency $F_1$ for example. Also, the tuning of the RF stage 9 and oscillator stage 13 is such that a carrier difference signal available from the mixer stage 11 should be at the frequency to which the IF stage 17 is tuned. Assuming a slight variation in the tuning of the oscillator stage 13, it can be readily understood that the resultant carrier difference signal available from the mixer stage 11 will deviate from the tuned frequency of the IF stage 17 and, in turn, from the center frequency of the signal detector stage 25.

This deviation in frequency of the carrier difference signal from the tuned frequency of the IF stage 17 is detected by the error signal detector stage 25 whereupon there is provided an error signal which is applied via the DC amplified stage 27 to the AFC switching means 29. Manual operation of the AFC switching means 29 disconnects the DC supply 31 and couples the error signal available from the DC amplifier stage 27 to the tuning means 33 of the oscillator stage 13.

In this manner, the frequency of the signal developed by the oscillator stage 13 is altered which in turn alters the frequency of the carrier difference signal available from the mixer stage 11 and applied to the IF stage 17. Thus, the closed loop feedback AFC system 23 serves to correct frequency deviations due to tuning and oscillator variations while keeping the frequency of the carrier difference signal at about the picture carrier frequency, $F_1$ of FIG. 2.

As previously mentioned, when the received signal is relatively weak, it has been found that the above-described AFC system has a tendency to block. In other words, it has been found that a relatively weak received signal is deleteriously affected by the sound carrier frequency $F_4$ of a strong adjacent channel. Thus, the error signal developed in the AFC system 23 is of a polarity opposite from the desired polarity. As a result, manual operation of the AFC switching means 29 provides a shift in the frequency of the oscillator stage 13 but, unfortunately, in a direction opposite to the desired direction. In other words, the oscillator stage 13 is shifted in frequency such that the resultant carrier difference signal applied to the tuned IF stage 17 is more remote from rather than closer to the band pass of the tuned IF stage 17.

However, it can be readily understood that a variation in RF signal strength, as indicated by the potential developed by the AGC system 35, applied to the variable capacitance diode device 39 of the signal optimizing circuit 37 shunting the winding 45 of the discriminator transformer 47 will cause a shift in the capacity across the winding 45 and, in turn, the center frequency tuning of the discriminator transformer 47. Thus, a shift in center frequency tuning of the discriminator transformer 47 will produce a shift in reference center level of the error signal developed by the AFC system 23. This shift in center level of the error signal from the AFC system 23 will be applied via the switching means 29 to the tuning means 33 of the oscillator stage 13.

In turn, the resultant carrier difference signal applied to the IF stage 17 from the mixer stage 11 will be shifted in frequency to a point, $F_3$ of FIG. 2 for instance, such that the picture signal-to-noise ratio is enhanced in accordance with the relative strength of the received signal. Thus, the AFC system 23 not only is prohibited from blocking on relatively weak signals but the signal-to-noise ratio of the receiver is enhanced on relatively weak signals.

As a typical example of present day values, the picture carrier signal $F_1$ of FIG. 2 may be at a frequency of about 45.75 mHz. with a sound carrier signal at a frequency $F_2$ of about 41.25 mHz. Also, the sound carrier signal of an adjacent channel $F_4$ would have a frequency of about 47.25 mHz. Upon receipt of a relatively weak signal, the IF picture carrier signal would be shifted in frequency by the signal optimizing circuit 37 from about 45.75 mHz. at a point $F_1$ to about 45.25 mHz. at a point $F_3$. Thus, the signal-to-noise ratio for relatively weak signals is enhanced by the signal optimizing circuit 37.

Figure 3:
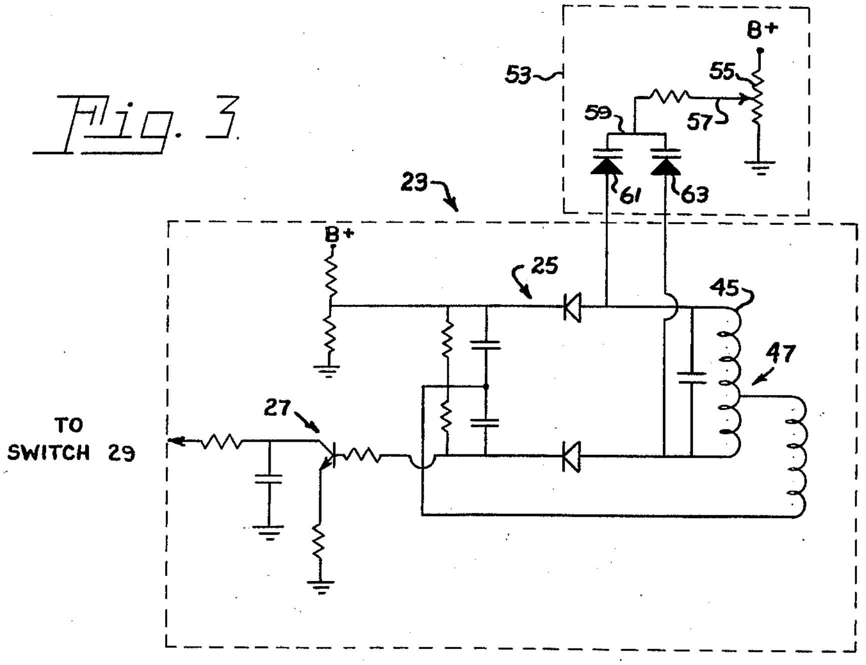
FIG. 3 is an alternative embodiment of a signal optimizing circuit.

Alternatively, FIG. 3 illustrates an AFC system 23 substantially identical to that of FIG. 1 and a signal optimizing circuit 53. Herein, the signal optimizing circuit 53 includes a resistor 55 coupled intermediate a voltage source B+ and a voltage reference level and having an adjustable arm 57 coupled to the junction 59 of a pair of variable capacitance diode devices 61 and 63 respectively shunting a winding 45 of the discriminator transformer 47 in the AFC system 23.

As previously explained with respect to FIG. 1, the reference center level of the error signal developed by the AFC system 23 is shifted by the signal optimizing circuit 53 in accordance with the magnitude of a received signal. In this particular embodiment, shifting of the reference center level of the error signal is accomplished by manual operation of the adjustable arm 57 of the resistor 55. Such adjustment would be made upon observation of the strength of a received signal as viewed on the cathode ray tube display device. Thus, this particular embodiment would be considered a manually operated system as compared with the automatic system previously described with respect to FIG. 1.

In review, it should be noted that signal optimizing circuitry for a television receiver automatic frequency control system has been provided. The circuitry not only prevents undesired blocking of the receiver upon manual operation of the automatic frequency system when a relative weak signal is received but, more importantly, enhances the signal-to-noise ratio of the system by shifting the frequency of a resultant carrier difference signal in accordance with the magnitude of the receiver signal. Moreover, the signal optimizing circuitry is applicable to an integrated automatic gain control (AGC) system or readily adapted to manual operation by a viewer.

While there has been shown and described what is at present considered the preferred embodiment of the invention, it will be obvious to those skilled in the art that various changes and modifications may be made therein without departing from the invention as defined by the appended claims.

We claim:

1. In a television receiver automatic frequency control system, signal optimizing circuitry comprising in combination:

signal processing channel means tuned to a substantially fixed intermediate carrier frequency;

oscillator means for developing a carrier signal at a first frequency, said means including frequency varying means;

mixer means coupled to said channel means and said oscillator means, said means combining a received modulated picture carrier signal and said oscillator carrier signal at a first frequency to provide a resultant carrier difference signal;

detector means coupled intermediate said signal channel means and said oscillator means and responsive to deviations of said resultant carrier difference signal from said fixed intermediate frequency carrier signal to provide an error signal for altering said frequency varying means of said oscillator means; and means coupled to said detector means for shifting the reference center level of said error signal in accordance with the the magnitude of said received modulated picture carrier signal whereby the frequency of said resultant carrier difference signal is shifted in accordance with the magnitude thereof.

2. The combination of claim 1 wherein said means for shifting the reference center level of said error signal is in the form of a variable capacitance diode.

3. The combination of claim 2 wherein said television receiver includes automatic gain control (AGC) circuitry providing a control signal representative of the magnitude of the received modulated picture carrier signal and means for applying said control signal to said means for shifting the reference center level of said error signal to automatically shift the frequency of the resultant carrier difference signal in accordance with the magnitude of the received modulated picture carrier signal.

4. The combination of claim 1 wherein said detector means includes a frequency discriminator transformer having a secondary winding and said means for shifting the reference center level of said error signal includes a variable capacitance diode shunting said secondary winding and coupled to an alterable potential source whereby varying said alterable potential source causes a shift in the center frequency of said detector means and a shift in frequency of the resultant carrier difference signal.

5. The combination of claim 1 wherein said detector means includes a frequency discriminator transformer having a secondary winding and said means for shifting the center frequency of said detector includes two variable capacitance diodes connecting each terminal of said secondary winding to a junction point and an alterable resistor coupled to said juction and intermediate a potential source and a potential reference level.

6. The combination of claim 1 wherein said detector means includes a frequency discriminator transformer having a secondary winding and said means for shifting the reference center level of said error signal includes a variable capacitance diode connecting each terminal of said secondary winding to a voltage reference level and an alterable resistor shunting said secondary winding and coupled to a voltage source.

References Cited

UNITED STATES PATENTS 2,891,105 6/1959 Keizer -------------- 178—5.8

ROBERT L. GRIFFIN, Primary Examiner

ROBERT L. RICHARDSON, Assistant Examiner

U.S. Cl. X.R.

325—422, 423; 331—17, 36